(12) United States Patent
Fujimoto et al.

(10) Patent No.: US 10,152,392 B2
(45) Date of Patent: Dec. 11, 2018

(54) COMMUNICATION APPARATUS AND WIRELESS COMMUNICATION SYSTEM

(71) Applicant: YOKOGAWA ELECTRIC CORPORATION, Musashino-shi, Tokyo (JP)

(72) Inventors: Naoyuki Fujimoto, Tokyo (JP); Kiyoshi Takai, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 96 days.

(21) Appl. No.: 15/037,252

(22) PCT Filed: Nov. 13, 2014

(86) PCT No.: PCT/JP2014/080017
§ 371 (c)(1),
(2) Date: May 17, 2016

(87) PCT Pub. No.: WO2015/076168
PCT Pub. Date: May 28, 2015

(65) Prior Publication Data
US 2016/0292051 A1    Oct. 6, 2016

(30) Foreign Application Priority Data
Nov. 20, 2013  (JP) ................................ 2013-239915

(51) Int. Cl.
G06F 11/00    (2006.01)
G06F 11/14    (2006.01)
(Continued)

(52) U.S. Cl.
CPC ........ *G06F 11/1471* (2013.01); *H04L 1/1835* (2013.01); *H04L 67/12* (2013.01); *H04W 4/38* (2018.02); *G06F 2201/805* (2013.01)

(58) Field of Classification Search
USPC ............................................... 714/15, 19, 20
See application file for complete search history.

(56) References Cited

U.S. PATENT DOCUMENTS 8,489,333 B2    7/2013  Bonavides et al.
2002/0188894 A1*  12/2002  Goodman ............. G06F 3/0614
                                                            714/43

(Continued)

FOREIGN PATENT DOCUMENTS

JP    61-152142 A    7/1986
JP    2008-124748 A   5/2008
(Continued)

OTHER PUBLICATIONS

International Search Report for PCT/JP2014/080017 dated Feb. 17, 2015.

*Primary Examiner* — Sarai E Butler
(74) *Attorney, Agent, or Firm* — Sughrue Mion, PLLC

(57) ABSTRACT

A communication apparatus of an embodiment of the present invention includes a storage temporarily storing data received via a wireless network from another communication apparatus that sends the data regarding feedback control at a fixed time interval and an arranger configured to read out and output at the fixed time interval the data stored in the storage and to arrange the data with the fixed time interval.

15 Claims, 8 Drawing Sheets

(51) Int. Cl.
  *H04L 1/18* (2006.01)
  *H04L 29/08* (2006.01)
  *H04W 4/38* (2018.01)

(56) References Cited

U.S. PATENT DOCUMENTS

| | | |
|---|---|---|
| 2007/0244571 A1 | 10/2007 | Wilson et al. |
| 2008/0126847 A1* | 5/2008 | Koarashi ............. G06F 11/1092 714/5.1 |
| 2009/0106578 A1* | 4/2009 | Dilman ............... G06F 11/0727 714/2 |
| 2009/0132858 A1* | 5/2009 | Koeda .............. G01N 35/00594 714/37 |
| 2010/0107008 A1* | 4/2010 | Radulescu ........... H04L 1/1635 714/18 |
| 2011/0010578 A1* | 1/2011 | Ag ndez Dominguez ................. H04L 67/104 714/4.1 |
| 2011/0044331 A1 | 2/2011 | Nagashima et al. |
| 2012/0296605 A1 | 11/2012 | Hamzaoui et al. |
| 2013/0103989 A1* | 4/2013 | Jensen ............... G05B 19/0425 714/47.2 |
| 2013/0346793 A1* | 12/2013 | Flynn .................. G06F 11/1008 714/6.3 |
| 2014/0047266 A1* | 2/2014 | Borthakur ........... G06F 11/2053 714/6.24 |
| 2015/0304193 A1 | 10/2015 | Ishii et al. |

FOREIGN PATENT DOCUMENTS

| | | |
|---|---|---|
| JP | 2008-258857 A | 10/2008 |
| JP | 2009-110180 A | 5/2009 |
| JP | 2013-222403 A | 10/2013 |

* cited by examiner

COMMUNICATION APPARATUS AND WIRELESS COMMUNICATION SYSTEM

CROSS REFERENCE TO RELATED APPLICATIONS

This application is a National Stage of International Application No. PCT/JP2014/080017 filed Nov. 13, 2014, claiming priority based on Japanese Patent Application No. 2013-239915 filed Nov. 20, 2013, the contents of all of which are incorporated herein by reference in their entirety.

TECHNICAL FIELD

The present invention relates to a communication apparatus and a wireless communication system.

The present application claims priority based on Japanese patent application 2013-239915, filed on Nov. 20, 2013 and includes herein by reference the content thereof.

BACKGROUND ART

Conventionally, in order to achieve a high level of automated operation in a plant, a factory, or the like, a distributed control system (DCS) has been implemented in which on-site devices (measuring instruments and actuators) referred to as field devices are connected to a control apparatus that controls the devices by a communication means. Although such a distributed control system has almost always communicated by cable, recent years have seen the implementation of communication systems that communicate wirelessly, in conformance with an industrial wireless communication standard such as ISA100.11a or WirelessHART (registered trademark).

Because wireless communication has a higher probability of communication errors occurring than in cable communication, transmitted data might be lost. If data is lost, retransmission processing of the lost data is done, and, when retransmission processing is repeatedly done, a very long delay might occur from the start to the completion of data transmission. Furthermore, because the delay time caused by this retransmission is dependent upon the number of data retransmissions, the delay time is not fixed, but rather varies greatly. When such data loss and delay time variation occur, it can be imagined that problems might occur in process control.

PTL1 noted below discloses a network control system that implements stable plant control, taking into consideration of data loss (packet loss) occurring in wireless communication. Specifically, the system disclosed in PTL1 noted below implements stable plant control, without a great disturbance of the plant state, by correcting actuation amounts at the controller side, even if a situation occurs in which an actuator, which is a type of field device, cannot receive an actuation amount from a controller due to the packet loss.

In the above-described distributed control system, various state quantities (for example, pressure, temperature, and flow amount) in an industrial process are controlled by feedback control. Feedback control in a distributed control system is a control scheme in which a control apparatus acquires measurement signals (feedback signals) of state quantities measured by field devices (measuring instruments), and in which the control apparatus controls the above-noted various state quantities by actuating field devices (actuators) so that the acquired feedback signals coincide with target values.

In a distributed control system performing such feedback control, loss of data indicating measurement results of field devices (measuring instruments) or data indicating actuation amounts with respect to field devices (actuators), risks erroneous operation occurring in the feedback control. If variation occurs in the data delay time, there is a risk that wasted time in the feedback control becomes large, and erroneous operation occurs in the feedback control. In this case, the term wasted time refers to the time from the output from a control apparatus of an actuating signal to a field device (actuator) until the effect thereof appears in the feedback signal.

Using the art disclosed in the above-described PTL 1, because an actuation amount of a field device (actuator) is corrected even if a packet loss occurs, it is possible to implement stable process control. However, in the above-described PTL 1, it becomes necessary to perform a complex computation in order to correct the actuation amount of a field device (actuator), and there is a risk of the load on the control apparatus becoming large.

CITATION LIST

Patent Literature

PTL1: Japanese Patent Application Publication No. 2009-110180

SUMMARY OF INVENTION

Technical Problem

An embodiment of the present invention provides a communication apparatus and a wireless communication system capable of simply accommodating data loss and variation in the communication delay time, without increasing the load on a control apparatus.

Solution to Problem

A communication apparatus of an embodiment of the present invention may include a storage temporarily storing data received via a wireless network from another communication apparatus that sends the data regarding feedback control at a fixed time interval and an arranger configured to read out and output at the fixed time interval the data stored in the storage and to arrange the data with the fixed time interval.

The communication apparatus may further include a completer configured to receive data arranged by the arranger and, if a loss of the arranged data occurs, to estimate and complete the lost data using data received before the lost data.

In the communication apparatus, the completer may be configured to determine a change amount with respect to time of the data received immediately prior the occurrence of the data loss and to estimate the lost data using the change amount.

In the communication apparatus, if the data loss occurs a pre-established number of times in succession, the completer may be configured to stop completion of the lost data and maintain the data completed immediately before.

The communication apparatus may further include an alarm transmitter configured to transmit an alarm to a host device and, if the data loss occurs a pre-established number of times in succession, the completer may be configured to cause the alarm transmitter to transmit an alarm.

In the communication apparatus, if the data loss continues in succession, the completer may be configured to complete the lost data using a change amount smaller than the change amount used to perform completion immediately before.

In the communication apparatus, the another communication apparatus may be a field device performing measurements required for the feedback control, and the data regarding the feedback control may be measurement data measured by the field device.

The communication apparatus may be a field device performing operations required for feedback control and may cause arrangement of control data as the data regarding the feedback control transmitted from the another communication apparatus.

A wireless communication system of an embodiment of the present invention may include a field device configured to transmit data regarding feedback control at a fixed time interval and capable of wireless communication via a wireless network, a setting apparatus configured to set whether or not the field device is a control application, and a communication apparatus configured to wirelessly communicate with the field device. The communication apparatus may include a storage temporarily storing the data received via the wireless network from the field device and an arranger configured to read out and output at the fixed time interval the data stored in the storage and to arrange the data with the fixed time interval. The communication apparatus may, in accordance with the setting by the setting apparatus, switch whether or not to arrange the data transmitted from the field device.

The wireless communication system may further include a management apparatus configured to increment the number of times of re-transmission of the data via the wireless network if a transmission error occurs, regarding the field device that has been set by the setting apparatus as a control application.

In the wireless communication system, the communication apparatus may further include a completer configured to receive the data that has been arranged by the arranger and, when data loss has occurred in the arranged data, to estimate and complete the lost data using data received before the lost data.

In the wireless communication system, the completer may be configured to determine the change amount with respect to time of the data received immediately before the occurrence of the data loss and to estimate the lost data using the change amount.

In the wireless communication system, if the data loss occurs in succession for a pre-established number of times, the completer may be configured to stop the completing of the lost data and to maintain the data completed immediately before.

In the wireless communication system, the communication apparatus may further include an alarm transmitter configured to transmit an alarm to a host device. If the data loss occurs successively for a pre-established number of times, the completer may be configured to cause the alarm transmitter to transmit an alarm.

In the wireless communication system, if the data loss continues in succession, the completer may be configured to complete the lost data using a change amount smaller than the change amount used to perform completion immediately before.

Advantageous Effects of Invention

According to an embodiment of the present invention, data transmitted via a wireless network from the other party in communication (the other party transmitting data regarding feedback control in an industrial process at a fixed time interval) is temporarily stored in a storage, and an arranger reads out and arranges the data stored in the storage with the fixed time interval of the transmission of the data by the other party in communication. As a result, the effect of enabling easy accommodation of variations of the communication delay time is achieved, without increasing the load on the control apparatus.

If a data loss occurs in the data arranged by the arranger, because completion is done by estimating the lost data using data received from the other party in communication before the lost data, the effect of easily accommodating data loss is achieved, without increasing the load on the control apparatus.

DESCRIPTION OF EMBODIMENTS

A communication apparatus and a wireless communication system according to a number of embodiments of the present invention will be described in detail below, with references being made to drawings.

First Embodiment

<Overall Wireless Communication System Constitution>

Figure 1:
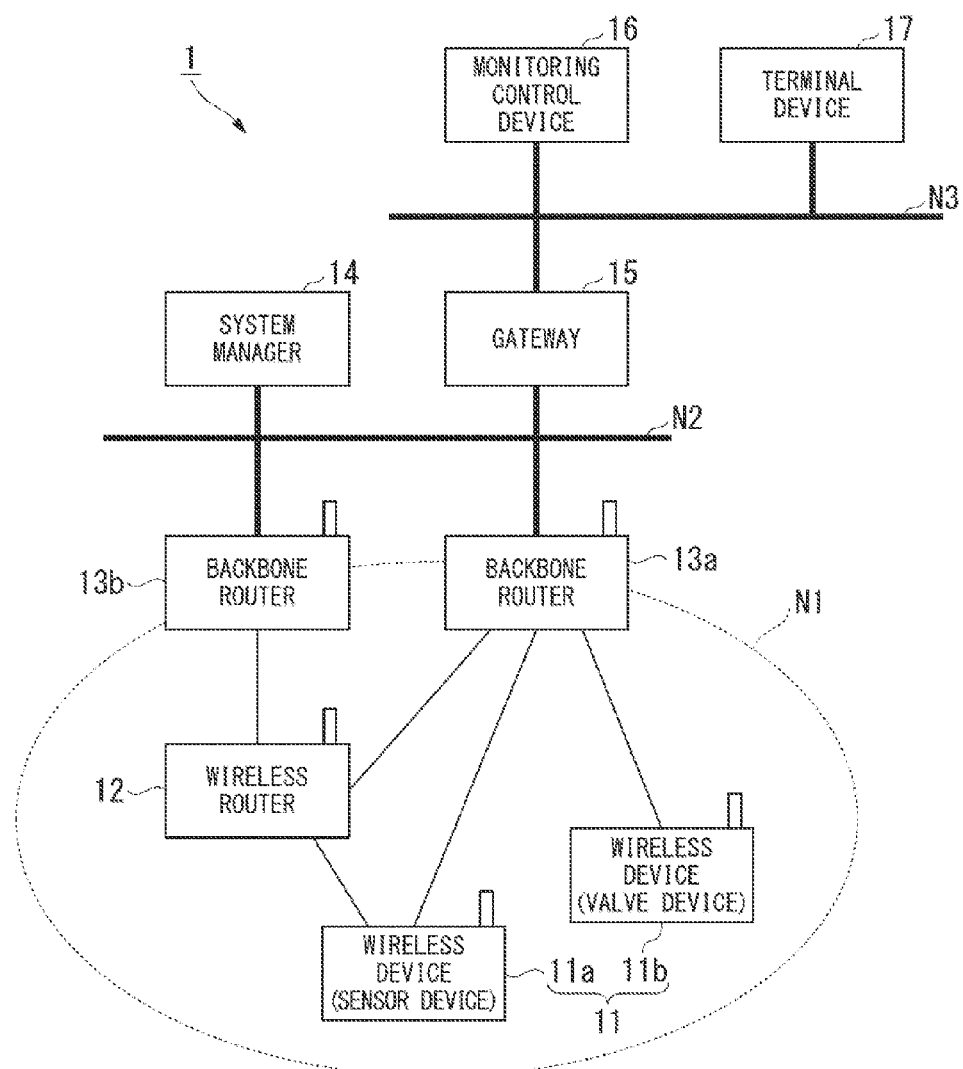
FIG. 1 is a block diagram showing the overall constitution of a wireless communication system according to a first embodiment of the present invention.

FIG. 1 is a block diagram showing the overall constitution of a wireless communication system according to the first embodiment of the present invention. As shown in FIG. 1, the wireless communication system 1 of the first embodiment has wireless devices 11 (field devices), a wireless router 12, backbone routers 13a and 13b, a system manager 14 (management apparatus), a gateway 15 (communication apparatus), a monitoring control device 16, and a terminal device 17 (setting device). The wireless communication system 1 can wirelessly communicate by TDMA (timedivision multiple access) via a wireless network N1. The wireless communication system 1 is implemented, for example, in a plant or factory (hereinafter referred to collectively as simply a plant).

A wireless network N1, a backbone network N2, and a control network N3 are provided in the plant in which the wireless communication system 1 is implemented. The wireless network N1 is implemented by the field devices 11 installed on-site in the plant, the wireless router 12, and the backbone routers 13a and 13b and is managed by the system manager 14. The numbers of wireless devices, wireless routers, and backbone routers forming the wireless network N1 are arbitrary.

The backbone network N2 is a cable network serving as the backbone of the wireless communication system 1, and has connected thereto the backbone routers 13a and 13b, the system manager 14, and the gateway 15. The control network N3 is a cable network positioned upstream from the backbone network N2, and has connected thereto the gateway 15, the monitoring control device 16, and the terminal device 17.

The wireless device 11 is a field device (wireless field device) installed on-site in a plant and performing measurements and operations required for control of an industrial process, under the control of the monitoring control device 16. Specifically, the wireless device 11 is, for example, a sensor device such as a flow gauge or temperature sensor, a valve device such as a flow control valve or open/close valve, an actuator device such as a fan or motor, an imaging device such as a camera or video that images a condition or observed target in the plant, an acoustic device such as a microphone or speaker that collects abnormal sounds or the like in a plant or outputs alarms or the like, a position detecting device that outputs position information of various devices, or some other device. The wireless device 11 operates with good energy efficiency (for example, operating intermittently), is powered by a battery, and can wirelessly communicate by TDMA in conformance with ISA100.11a.

In the first embodiment, to facilitate understanding, the example described will be that of the state quantity in an industrial process to be controlled being the flow amount of a fluid. For this reason, in FIG. 1, one each of sensor device 11a, which is a wireless device 11 performing measurement of the flow amount, and the valve device 11b, which is a wireless device 11 manipulating the amount of flow are illustrated. The sensor device 11a transmits flow amount measurement data at a fixed time interval (for example, an interval of 1 second), and the valve device 11b, based on control data output from the monitoring control device 16 at a fixed time interval (for example, an interval of 1 second) and transmitted via the gateway 15, operates the opening of a valve. Both of the sensor device 11a and the valve device 11b are used in feedback control.

The wireless router 12 wirelessly communicates between the wireless devices 11 and each of the backbone routers 13a and 13b in conformance with ISA100.11a, and relays data transmitted and received between the wireless devices 11 and each of the backbone routers 13a and 13b. The backbone routers 13a and 13b connect the wireless network N1 and the backbone network N2, and relay data transmitted and received between the wireless network N1 and the backbone network N2. The backbone routers 13a and 13b wirelessly communicate in conformance with the above-noted wireless communication standard ISA100.11a.

The system manager 14 controls the wireless communication performed via the wireless network N1. Specifically, it controls the allocation of communication resources (time slots and channels) to the wireless devices 11, the wireless router 12, the backbone routers 13a and 13b, and the gateway 15, and implements wireless communication by TDMA via the wireless network N1. The system manager 14 also performs processing to cause the wireless devices 11, the wireless router 12, and the backbone routers 13a and 13b to join the wireless network N1.

The system manager 14, in accordance with the contents set by the terminal device 17 (which will be described later, these contents indicating whether a wireless device 11 is for control or for monitoring), controls whether or not to make a large time slot allocation to the wireless device 11, which is the target, for the purpose of data re-transmission. Specifically, the system manager 14 allocates more of the above-noted time slots to a wireless device 11 that is set for control.

The reason for doing this type of control is that, by increasing the number of times that data re-transmission via the wireless network N1 can be done when a transmission error occurs, the variation in the delay time is reduced and the proportion of data that is lost is reduced. With regard to a field device for monitoring, because not many time slots are allocated for data re-transmission, it is possible to reduce wasteful battery consumption caused by performing frequency data re-transmission.

The gateway 15 connects the backbone network N2 and the control network N3, and relays various data transmitted and received between the wireless devices 11 and the system manager 14 and the like, and the monitoring control device 16 and terminal device 17. By providing this gateway 15, a mutual connection between the backbone network N2 and the control network N3 is possible, while maintaining security.

The gateway 15, in accordance with the contents set by the terminal device 17 (these contents indicating whether a wireless device 11 is for control or for monitoring), switches whether or not to arrange data transmitted from the wireless device 11 with a fixed time interval. For example, with regard to measurement data transmitted from the sensor device 11a used in feedback control, processing is performed so as to arrange the data with a fixed time interval (the time interval at which the sensor device 11a transmits measurement data) and to estimate and complete lost measurement data if a loss occurs in the measurement data. This type of processing is done because, by accommodating loss and variation in the communication time delay when measurement data from the sensor device 11a is transmitted via the wireless network N1, the occurrence of erroneous operation in the feedback control can be prevented.

The monitoring control device 16 performs monitoring and management of the wireless devices 11 and the like. Specifically, the monitoring control device 16 monitors the wireless devices 11 and the like by collecting measurement data (for example, flow amount values) from a wireless device 11 via the gateway 15. The monitoring control device 16 determines a control amount (for example, the valve opening of a valve device) of a wireless device 11, based on the collected measurement data, and controls the valve device 11b by transmitting via the gateway 15 to the wireless device 11 control data indicating the control amount at a fixed time interval. That is, the monitoring control device 16 uses feedback to control various state quantities, such as flow amount, in an industrial process.

The terminal device 17 is, for example, operated by a plant operator, and used to monitor and control a wireless device 11. Specifically, the terminal device 17 has an input device such as a keyboard or pointing device and a display device such as a liquid-crystal display device, and displays for the operator on the display device the monitoring results of the wireless device 11 obtained by the monitoring control device 16, and also outputs to the monitoring control device 16 instructions input to the input device by an operator and causes the monitoring control device 16 to perform control in accordance with those instructions.

The terminal device 17 is used for making various settings in the wireless communication system 1. The following can be cited as settings made by the terminal device 17.

Class of wireless device 11

Measurement interval of the sensor device 11a

Delay time in the gateway 15

Maximum number of successive completions performed in the gateway 15

The wireless devices 11 are grouped as those used for feedback control (field device for control) and those used for monitoring, such as imaging devices and acoustic devices, and the like (field devices for monitoring). The above-noted class of a wireless device 11 indicates whether the device is a field device for control or a field device for monitoring. In the first embodiment, to simplify the description, the sensor device 11a and the valve device 11b are set as field devices for control.

<Gateway Constitution>

Figure 2:
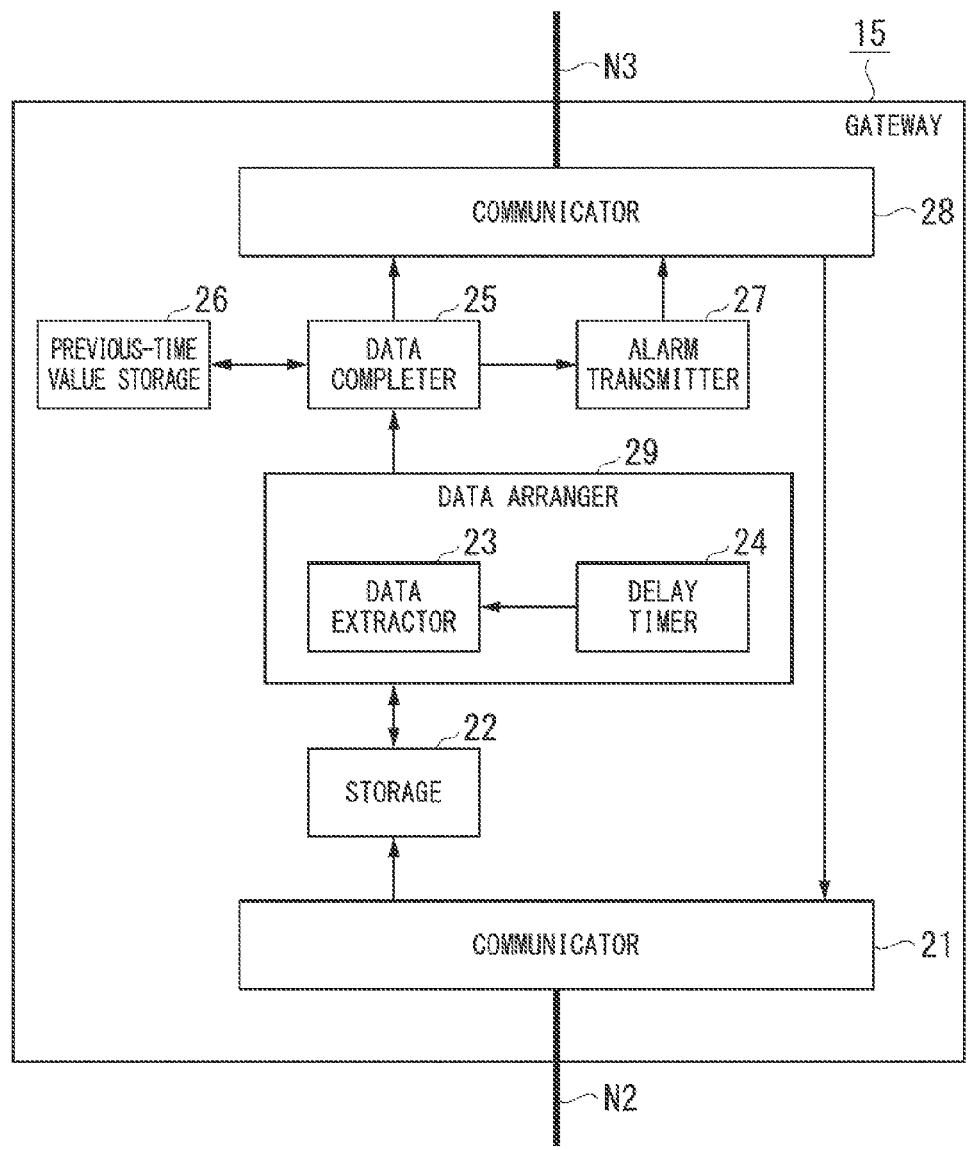
FIG. 2 is a block diagram showing the constitution of the main part of a gateway as a communication apparatus according to the first embodiment of the present invention.

FIG. 2 is a block diagram showing the constitution of the main part of the gateway as a communication apparatus according to the first embodiment of the present invention. As shown in FIG. 2, the gateway 15 has a communicator 21, a storage 22, a data extractor 23, a delay timer 24, a data completer 25 (completer), a previous-time value storage 26, an alarm transmitter 27, and a communicator 28. The data extractor 23 and the delay timer 24 constitute a data arranger 29. Although it is not illustrated in FIG. 2, because the gateway 15, as described above, mutually connects the backbone network N2 and the control network N3, a processor is provided that performs conversion processing of the data passed between these networks.

The communicator 21 is connected to the backbone network N2 and, in addition to receiving data transmitted via the backbone network N2, transmits data to be transmitted to the backbone network N2 to the backbone network N2. Data that is transmitted via the above-noted backbone network N2 is, for example, measurement data from the sensor device 11a, and data to be transmitted to the backbone network N2 is, for example, control data to be transmitted to the valve device 11b.

The storage 22 has, for example, a volatile or a non-volatile memory, and temporarily stores data received by the communicator 21 (for example, measurement data from the sensor device 11a). The measurement data and the like from the sensor device 11a has a "transmission sequence number" indicating the transmission sequence and a "transmission time stamp" indicting the transmission time attached thereto. Therefore, if measurement data loss has not occurred, the measurement data to be stored in the storage 22 is arranged in transmission sequence number order (or in transmission time order).

The data extractor 23 of the data arranger 29, by reading out data stored in the storage 22 using the time information output from the delay timer 24, arranges the data stored in the storage 22 with a fixed time interval (the time interval of transmission of the measurement data by the sensor device 11a). Specifically, the data extractor 23 determines whether or not data is stored in the storage 22 to which is attached a "transmission time stamp" indicating a time that is earlier than the time indicated by the time information output from the delay timer 24. If the determination is that such data is stored in the storage 22, the data extractor 23 reads the data from the storage 22, outputs it to the data completer 25. If, however, the determination is that such data is not stored in the storage 22, a pre-established empty data is output to the data completer 25.

The delay timer 24 of the data arranger 29 outputs the time information indicating a time that is delayed by a pre-established delay time of $\Delta t$ from the actual time to the data extractor 23 at a fixed time interval (the time interval with which the sensor device 11a transmits measurement data). This fixed time interval (time interval with which the sensor device 11a transmits measurement data) is set in the delay timer 24 beforehand. The delay time $\Delta t$ set in the delay timer 24 is established with consideration to the delay characteristics of the wireless network N1. For example, the delay time $\Delta t$ is set longer, the larger is the delay in the wireless network N1, and conversely the delay time $\Delta t$ is set shorter, the smaller is the delay time in the wireless network N1. A delay timer 24 such as this is used in order to enable the data extractor 23 to arrange data even if variations in the communication delay occur.

If loss occurs of data output from the data extractor 23, the data completer 25 estimates and completes the lost data, using data received before the data that has been lost, stores the completed data in the previous-time value storage 26, and outputs the completed data to the communicator 28. Specifically, if empty data (data not accompanied by a "transmission sequence number") is output from the data extractor 23, the data completer 25 determines the change amount with respect to time of the data stored in the previous-time value storage 26 and estimates the lost data using that change amount.

Figure 3A:
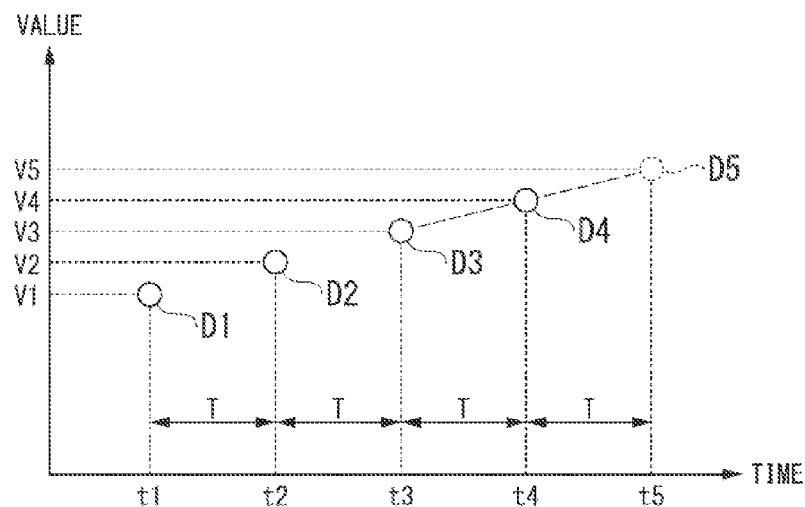
FIG. 3A is a drawing for describing the data completing method in the first embodiment of the present invention.
Figure 3B:
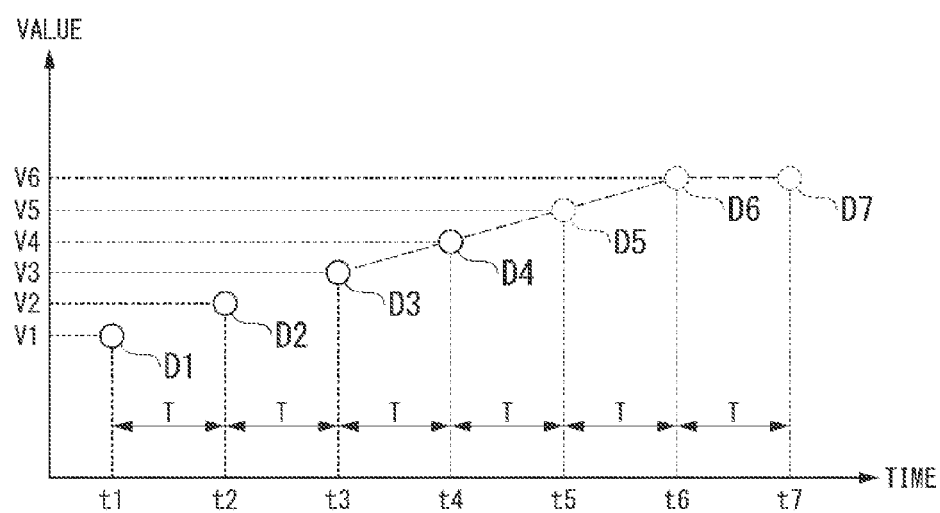
FIG. 3B is a drawing for describing the data completing method in the first embodiment of the present invention.

FIG. 3A and FIG. 3B are drawings for describing the method of completing data in the first embodiment of the present invention. FIG. 3A is a drawing of the basic completion processing performed by the gateway 15, and FIG. 3B is a drawing of the completion processing performed by the gateway 15 if a loss of data occurs in succession. In the graphs of FIG. 3A and FIG. 3B, the horizontal axis represents time, and the vertical axis represents the value of data. In FIG. 3A and FIG. 3B, to simplify the description, the case is one in which variation does not occur in the communication delay, and in which data (data D1 to D4) are received at a fixed time interval T by the gateway 15.

Consider the case in which, as shown in FIG. 3A, after data D1 to D4 are received at the times t1 to t4, respectively, and data D5 is lost at the time t5. The data completer 25 of the gateway 15 reads out the previous-time value (the data D4 value V4) and the second-previous time value (the data D3 value V3) stored in the previous-time value storage 26 and estimates the data D5 value V5 that has been lost, using the following Equation (1).

$$V5=(V4-V3)/T \times T+V4 \qquad (1)$$

In this manner, the data completer 25 determines the change amount $\theta$ (where $\theta=(V4-V3)/T$) of the data D3 and D4 and estimates the loss data, using the change amount $\theta$. The change amount $\theta$ of the above-noted data D3 and D4 is the change amount of data immediately before the loss of data (loss of the data D5) occurred.

As shown in FIG. 3B, even if data is lost in succession, the data completer 25, using basically the same method as described using FIG. 3A, estimates and completes the lost data. However, if data loss continues in succession for a pre-established number of times N, the data completer 25 stops the data completion and maintains the previous-time value. For example, if the above-noted pre-established number of times N is 3 and the three data D5 to D7 shown in FIG. 3B are lost in succession, the data completer 25 maintains the third data D7 value as the data D6 value V6 (previous-time value).

This type of processing is done to limit the number of successive completions of data for the sake of safety, because it can be envisioned that, when successive data completion is done, the offset from actual data values can become large. If data loss occurs in succession for the pre-established number of time N, the data completer 25 controls the alarm transmitter 27 to cause it to transmit an alarm to the host device (monitoring control device 16) via the communicator 28.

As shown in FIG. 3B, if the data D5 to D7 are lost in succession, the values V5 to V7 of the data D5 to D7 estimated by the data completer 25 are represented together by the following Equations (2) to (4).

$$V5=\theta \times T+V4 \quad (2)$$

$$V6=\theta \times T+V5 \quad (3)$$

$$V7=V6 \quad (4)$$

Referring to the above-noted Equations (2) to (4), the data values (values V5 and V6) to be estimated if data is lost in succession, increase or decrease monotonically by the change amount $\theta$ each time. If completion is done in this manner, it can be envisioned that a large offset can occur between the estimated data values (values V5 and V6) and the actual data values. For this reason, if data loss occurs in succession, the data completer 25 may use another completion method, described below, to estimate the current time data so that change amount $\theta$ with respect to the previous-time data becomes gradually smaller.

Figure 4:
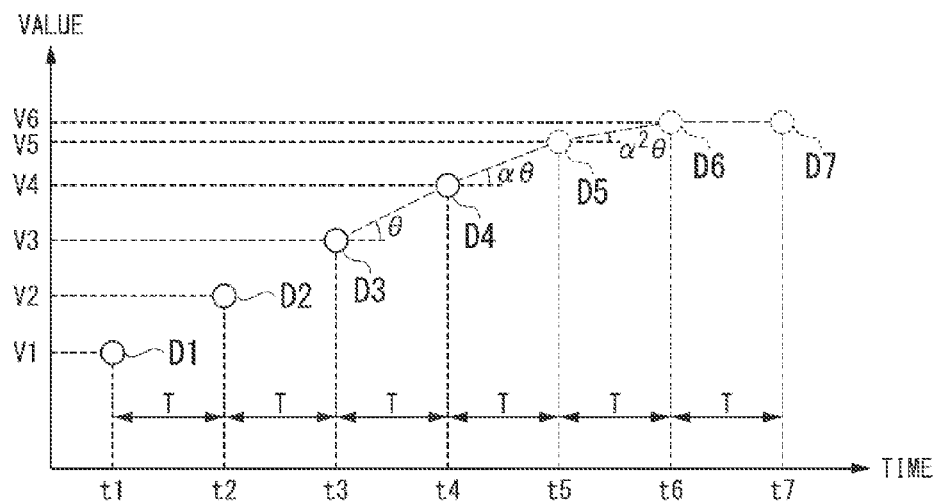
FIG. 4 is a drawing for describing another data completing method in the first embodiment of the present invention.

FIG. 4 is a drawing for describing another data completion method in the first embodiment of the present invention. In the graph shown in FIG. 4, similar to the graph shown in FIG. 3B, the horizontal axis represents time, and the vertical axis represents the value of data. In FIG. 4 as well, to simplify the description, the case in one in which variation does not occur in the communication delay, and in which data (data D1 to D4) are received at a fixed time interval T by the gateway 15.

As shown in FIG. 4, using an attenuation coefficient $\alpha(0<\alpha<1)$, the data completer 25 estimates the current-time data so that the change amount is gradually reduced. If the data loss has continued in succession for the established N times, the data completer 25, similar to the completion method described using FIG. 3A and FIG. 3B, stops the data completion and maintains the previous-time value. If the completion method shown in FIG. 4 is used, the values V5 to V7 of the data D5 to D7 estimated by the data completer 25 are represented together by the following Equations (5) to (7).

$$V5=\alpha \times \theta \times T+V4 \quad (5)$$

$$V6=\alpha^2 \times \theta \times T+V5 \quad (6)$$

$$V7=V6 \quad (7)$$

If the data output from the data extractor 23 is the data read out from the storage 22 (data to which a "transmission sequence number" is affixed), the data completer 25 stores that data into the previous-time value storage 26 and outputs it to the communicator 28. That is, if the data output from the data extractor 23 is the data read out from the storage 22, the above-described completion processing by the data completer 25 is omitted.

The previous-time value storage 26 stores two data values, the previous-time value and the second-previous-time value output from the data completer 25 to the communicator 28. The data stored in the previous-time value storage 26 (the previous-time value and second-previous time value) are updated each time a new data is output from the data completer 25 to the communicator 28. The alarm transmitter 27, controlled by the data completer 25, transmits an alarm (an alarm indicating that data loss has occurred successively for the established number of times N) to the monitoring control device 16, which is the host device via the communicator 28.

The communicator 28 is connected to the control network N3, receives data transmitted via the control network N3, and transmits to the control network N3 data that should be transmitted to the control network N3. The data that is transmitted via the control network N3 is, for example, control data that should be transmitted to the valve device 11b, and the data that should be transmitted to the control network N3 includes, for example, data (measurement data) output from the data completer 25 and an alarm output from the alarm transmitter 27.

<Wireless Communication System Operation>

Figure 5:
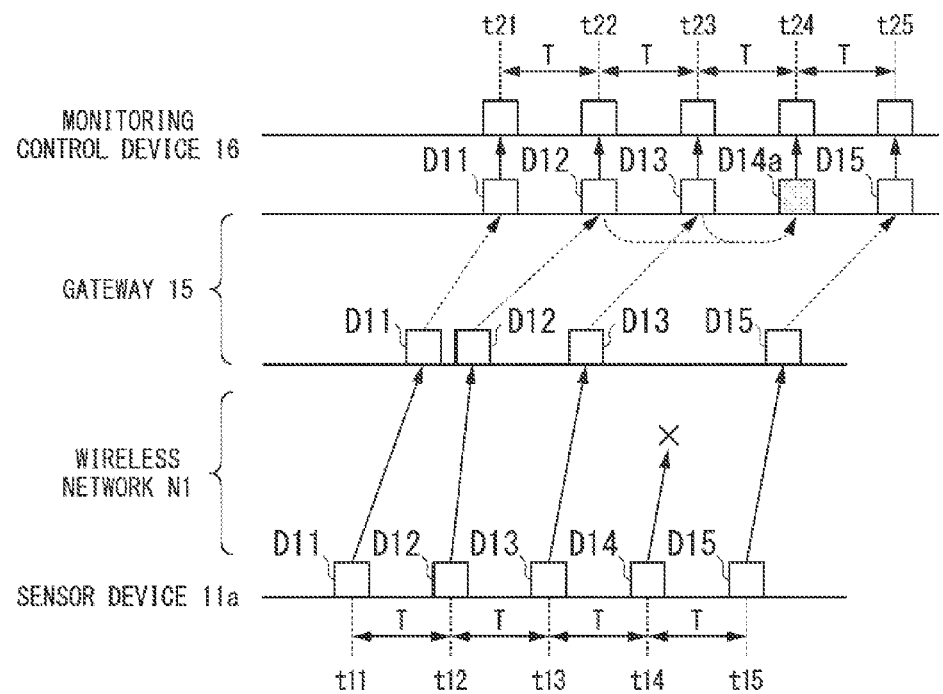
FIG. 5 is a timing diagram for describing the operation of a wireless communication system according to the first embodiment of the present invention.

Next, the operation of feedback control performed in the wireless communication system 1 constituted as noted above will be described. FIG. 5 is a timing diagram for describing the operation of the wireless communication system according to the first embodiment of the present invention. As shown in FIG. 5, measurement data D11 to D15 are sequentially transmitted from the sensor device 11a to the monitoring control device 16 at a fixed time interval T.

The measurement data D11 to D15, which are sequentially transmitted from the sensor device 11a, pass sequentially through the wireless network N, the backbone router 13a (or the backbone router 13b) and the backbone network N2, are input to the gateway 15, are received by the communicator 21 shown in FIG. 2, and are sequentially stored in the storage 22. In the example shown in FIG. 5, although the measurement data D11 to D15 are transmitted from the sensor device 11a with a fixed time interval T, because of the delay occurring in the wireless network N1, they are not received at the gateway 15 with the fixed time interval T. In the example shown in FIG. 5, because the measurement data D14 is lost and is not received at the gateway 15, the measurement data D14 is not stored in the storage 22.

Figure 6:
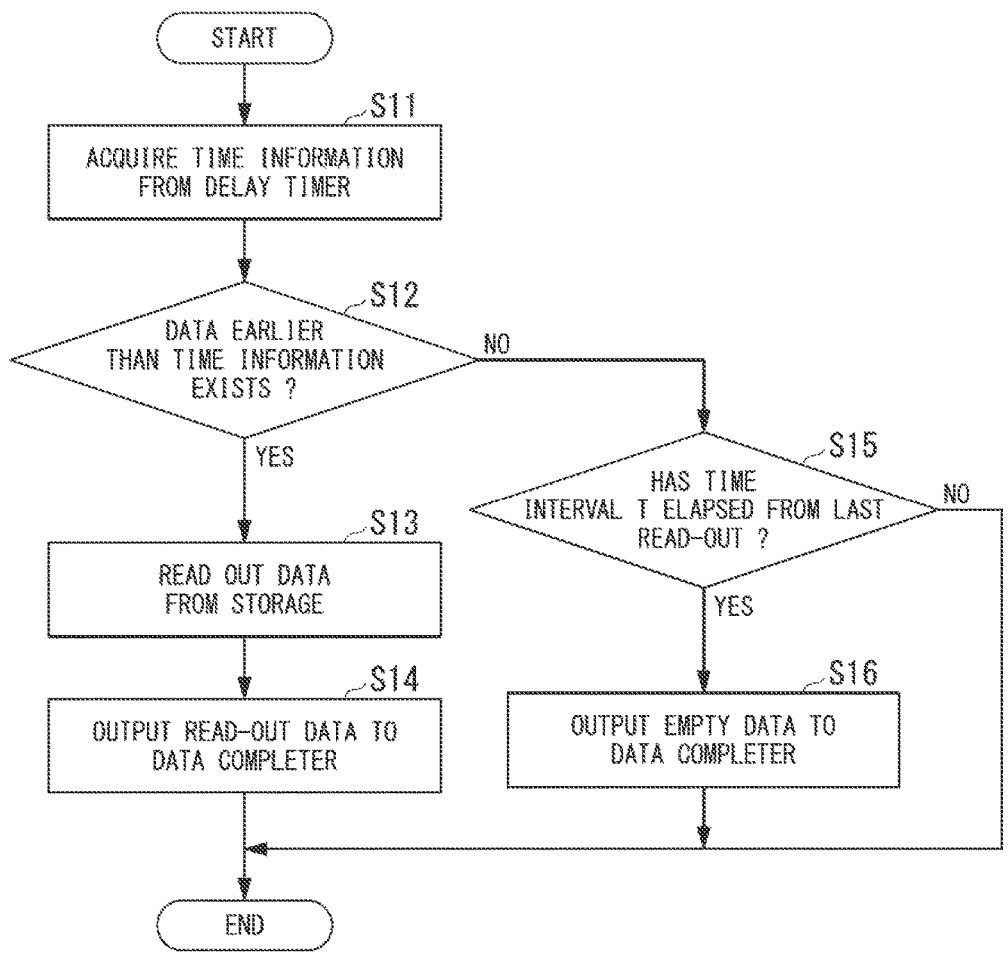
FIG. 6 is a flowchart showing the processing performed in a data extractor of a gateway in the first embodiment of the present invention.
Figure 7:
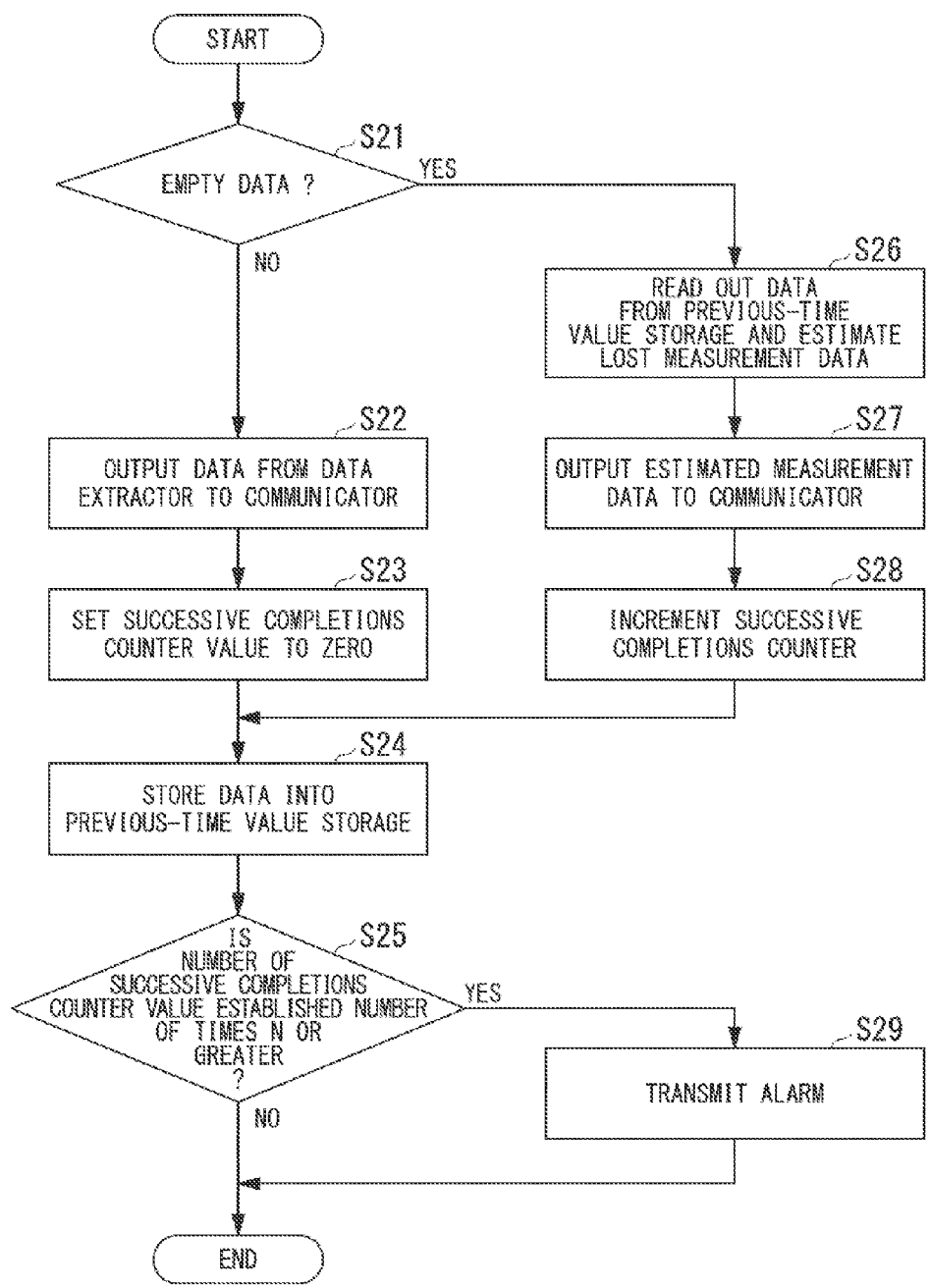
FIG. 7 is a flowchart showing the processing performed in the data completer of a gateway in the first embodiment of the present invention.

At the gateway 15, the operation of the arranging the measurement data that was stored in the storage 22 with a fixed time interval (the time interval T with which the measurement data is transmitted by the sensor device 11a) and the completion of the measurement data that was lost are performed. FIG. 6 is a flowchart showing the processing performed in the data extractor of the gateway in the first embodiment of the present invention. FIG. 7 is a flowchart showing the processing performed in the data completer of the gateway in the first embodiment of the present invention. The flowchart shown in FIG. 6 is executed each time information is output from the delay timer 24 to the data extractor 23, and the flowchart shown in FIG. 7 is executed each time data is output from the data extractor 23 to the data completer 25.

When the processing of the flowchart shown in FIG. 6 starts, the data extractor 23 first performs processing to acquire time information output from the delay timer 24

(step S11). Next, the data extractor 23 performs processing to search the storage 22 and to determine whether or not data before the time indicated by the time information acquired at step S11 is stored in the storage 22 (step S12). Specifically, a determination is made as to whether or not there exists measurement data having a "transmission timestamp" indicating a time earlier than the time indicated by the time information acquired at step S11.

If a determination is made that measurement data earlier than the time indicated by the time information acquired at step S11 is stored in the storage 22 (determination result of YES at step S12), the data extractor 23 performs processing to read that measurement data out from the storage 22 (step S13). Then, the data extractor 23 performs processing to output the read-out measurement data to the data completer 25 (step S14), and the series of processing shown in FIG. 6 ends. Because the flowchart shown in FIG. 6 is performed each time the time information is output from the delay timer 24 to the data extractor 23, the measurement data read out by the data extractor 23 and output to the data completer 25 is arranged with a fixed time interval (the time interval T with which the sensor device 11a transmits the measurement data).

If, however, a determination is made that measurement data earlier than the time indicated by the time information acquired at step S11 is not stored in the storage 22 (determination result of NO at step S12), the data extractor 23 determines whether or not the time interval T has elapsed from the last time measurement data was read out from the storage 22 (step S15).

If a determination is made that the above-noted time interval T has elapsed (determination result of YES at step S15), the data extractor 23 performs processing to output empty data to the data completer 25 (step S16), and the series of processing shown in FIG. 6 ends. If, however, a determination is made that the above-noted time interval T has not elapsed (determination result of NO at step S15), the series of processing shown in FIG. 6 is ended without performing the processing of step S16.

By the processing of the above-described step S14, the data extractor 23 outputs measurement data to the data completer 25, or by the processing of the above-noted step S16, the data extractor 23 outputs empty data to the data completer 25, after either of which the processing of the flowchart shown in FIG. 7 starts. When the processing of the flowchart shown in FIG. 7 starts, the data completer 25 first determines whether or not the data output from the data extractor 23 is empty data (step S21).

If a determination is made that the data from the data extractor 23 is not empty data (determination result of NO at step S21), the data completer 25 performs processing to output the data (measurement data) from the data extractor 23 to the communicator 28 (step S22). Next, the data completer 25 performs processing to set the value of a counter indicating the number of continuous successive data completions (successive completions counter) to zero (step S23) and store the data (measurement data) from the data extractor 23 in the previous-time value storage 26 (step S24).

Next, the data completer 25 determines whether or not the value of the successive completions counter is at least the above-described established number of times N (step S25). If a determination is made that the data from the data extractor 23 is not empty (determination result of NO at step S21), because the value of the successive completions counter is set to zero by the processing of step S23, the determination result of step S25 is NO, and the series of processing shown in FIG. 7 ends.

If, however, a determination is made at step S21 that the data from the data extractor 23 is empty (determination result of YES at step S21), the data completer 25 performs processing to read out data stored in the previous-time value storage 26 (previous-time value and second-previous time value) and to estimate the lost measurement data (current-time data) (step S26). Specifically, the lost measurement data is estimated by the completion method described using FIGS. 3A and 3B or FIG. 4.

Next, the data completer 25 performs processing to output the estimated measurement data to the communicator 28 (step S27). Next, the data completer 25 performs processing to increment the successive completions counter (step S28) and to store the estimated data in the previous-time value storage 26 (step S24).

Next, the data completer 25 determines whether or not the value of the successive completions counter is at least the above-described established number of times N (step S25). If a determination is made that the value of the successive completions counter is smaller than the established number of times N (determination result of NO at step S25), the series of processing shown in FIG. 7 is ended. If, however, a determination is made that the value of the successive completions counter is at least the established number of times N (determination result of YES at S25), the data completer 25 performs processing to control the alarm transmitter 27 to transmit an alarm to the host device (monitoring control device 16), via the communicator 28 (step S29), and the series of processing shown in FIG. 7 ends.

By the above processing, as shown in FIG. 5, the measurement data D11 to D15 are output from the gateway 15 at a fixed time interval T. The lost measurement data D14 is output as the completed measurement data D14a at the gateway 15. Therefore, the measurement data D11 to D13, D14a, and D15 are received at the monitoring control device 16 with the same time interval as the time interval T with which the measurement data D11 to D15 are output from the sensor device 11a.

When the measurement data D11 to D15 (including the completed measurement data D14a) are received from the sensor device 11a, the monitoring control device 16 performs processing to compute the actuation amounts of the valve device 11b, using these measurement data D11 to D15. Control data indicating the computed actuation amounts of the valve device 11b are sequentially transmitted from the monitoring control device 16 to the valve device 11b with the fixed time interval T.

The control data transmitted from the monitoring control device 16 passes sequentially through the control network N3, gateway 15, backbone network N2, backbone router 13a (or backbone router 13b), and the wireless network N1 and is received by the valve device 11b. Then, actuation to adjust the opening of the valve is done at the valve device 11b, based on the control data from the monitoring control device 16. The above-noted feedback control is repeated to perform control of state quantities (for example, flow amount) in an industrial process.

As described above, in the first embodiment, measurement data output by the sensor device 11a at the fixed time interval T and transmitted via the wireless network N1 is arranged at the gateway 15 and, if loss of measurement data occurs, the lost measurement data is estimated and completed. Thus, loss of measurement data and variation in the communication delay can be simply accommodated, without increasing the load on the monitoring control device 16.

Second Embodiment

Figure 8:
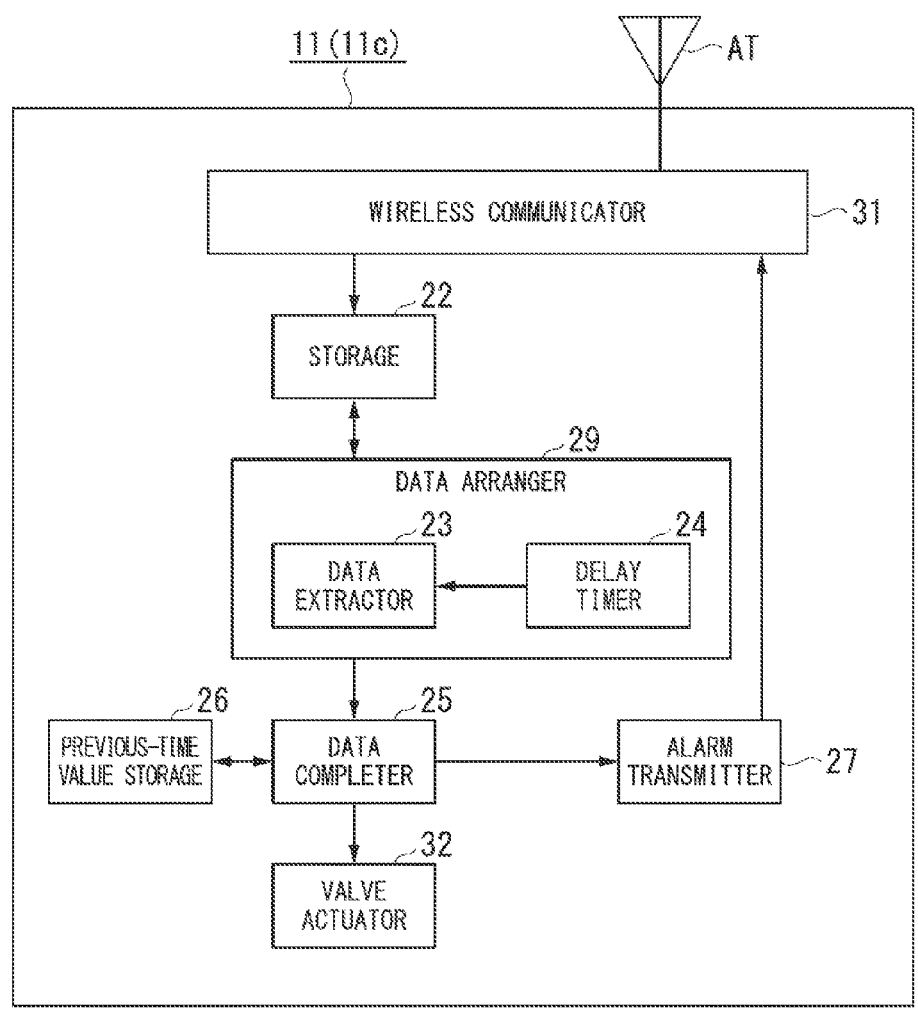
FIG. 8 is a block diagram showing the constitution of the main part of a wireless device used in a wireless communication system according to a second embodiment of the present invention.

FIG. 8 is a block diagram showing the constitution of the main part of a wireless device used in a wireless communication system according to the second embodiment of the present invention. The wireless device 11 shown in FIG. 8 is the valve device 11c (communication apparatus) that manipulates the flow amount. In FIG. 8, blocks that are the same as in blocks shown in FIG. 2 are assigned the same reference symbols. The overall constitution of the wireless communication system of the second embodiment is the same as that of the wireless communication system shown in FIG. 1.

As shown in FIG. 8, the valve device 11c, in addition to the storage 22, the data extractor 23, the delay timer 24, the data completer 25, the previous-time value storage 26, and the alarm transmitter 27 shown in FIG. 2, has an antenna AT, a wireless communicator 31, and a valve actuator 32. The data extractor 23 and the delay time 24 constitute a data arranger 29. The antenna AT is connected to the wireless communicator 31 and transmits and receives a wireless signal. The wireless communicator 31 performs receiving processing of a wireless signal received by the antenna AT and transmitting processing of a signal to be transmitted from the antenna AT. The valve actuator 32 actuates the opening of a valve (not shown), based on data output from the data completer 25.

A valve device 11c having a constitution such as this performs data arrangement and completion similar to the gateway 15 shown in FIG. 2. Specifically, in addition to arranging control data, which has been output from the monitoring control device 16 and transmitted via the gateway 15 and the wireless network N1 and the like with a fixed time interval (the time interval with which the monitoring control device 16 transmits the control data), if a loss of control data occurs, the valve device 11c estimates and completes the lost control data. Because the processing performed by the valve device 11c is basically the same as the processing performed by the gateway 15, the description thereof will be omitted.

Figure 9:
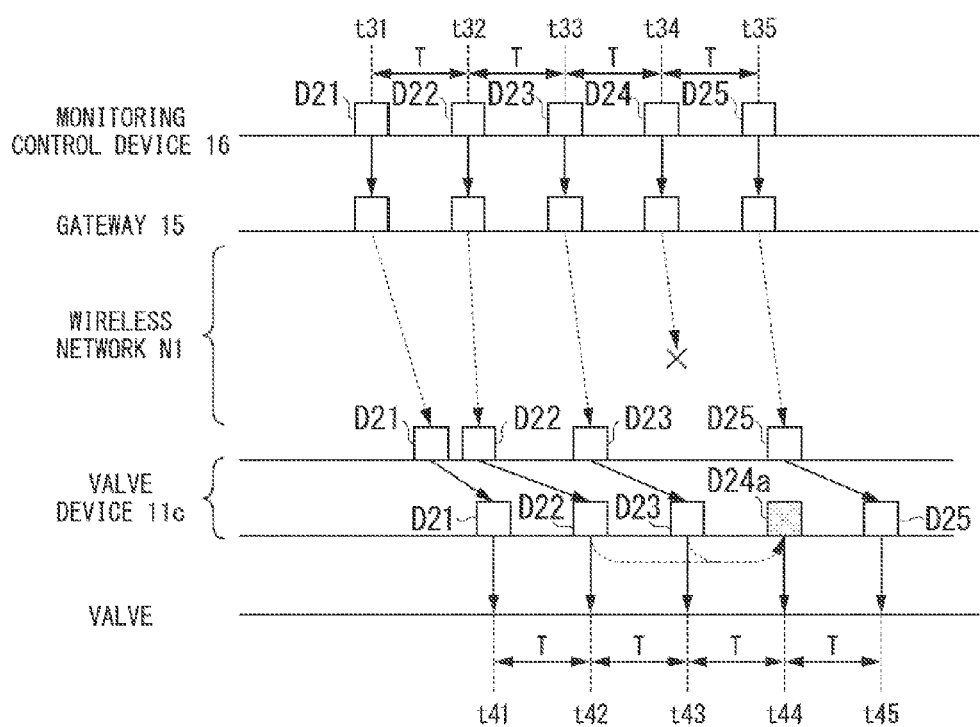
FIG. 9 is a timing diagram for describing the operation of a wireless communication system according to the second embodiment of the present invention.

Next, the operation of feedback control performed in the wireless communication system of the second embodiment will be described. FIG. 9 is a timing diagram for describing the operation of the wireless communication system according to the second embodiment of the present invention. In the second embodiment as well, the same as in the first embodiment, measurement data is transmitted from the sensor device 11a to the monitoring control device 16 with a fixed time interval T, and the monitoring control device 16 computes an actuation amounts of the valve device 11c using the measurement data. Therefore, as shown in FIG. 9, the control data D21 to D25 are sequentially transmitted from the monitoring control device 16 to the valve device 11c at the fixed time interval T.

The control data D21 to D25 sequentially transmitted from the monitoring control device 16 passes sequentially through the control network N3, gateway 15, backbone network N2, backbone router 13a (or backbone router 13b), and wireless network N1, are received by the valve device 11c, are subjected to receiving processing by the wireless communicator 31 shown in FIG. 8, and are stored sequentially in the storage 22.

However, as shown in FIG. 9, although the control data D21 to D25 are transmitted from the monitoring control device 16 and the gateway 15 with a fixed time interval T, because of the delay occurring in the wireless network N1, they are not received at the valve device 11c with a fixed time interval T. In the example shown in FIG. 9, because the control data D24 is lost and not received at the valve device 11c, the control data D24 is not stored in the storage 22.

At the valve device 11c processing is performed similar to that in the gateway 15 shown in FIG. 2. That is, processing is performed that is the same as described using FIG. 6 and FIG. 7. For this reason, as shown in FIG. 9, the valve actuator 32 of the valve device 11c has input thereto the control data D21 to D25 at a fixed time interval T. The lost control data D24 is completed within the valve device 11c and input to the valve actuator 32. Therefore, the valve actuator 32 of the valve device 11c actuates the valve with a time interval that is the same as the time interval with which the control data D21 to D25 are output from the monitoring control device 16. The above-noted feedback control is repeated to perform control of state quantities (for example, flow amount) in an industrial process.

As described above, in the second embodiment, control data output at a fixed time interval T from the monitoring control device 16 and the gateway 15 and transmitted via the wireless network N1 are arranged at the valve device 11c and, if loss of control data occurs, the lost control data is estimated and completed. Thus, loss of control data and variation in the communication delay can be simply accommodated, without increasing the load on the monitoring control device 16 and the like.

Although the foregoing has been a description of communication apparatuses and wireless communication systems according to a number of embodiments of the present invention, the present invention is not restricted to the above-described embodiments, and may be freely changed, within the scope thereof. For example, although the gateway 15 and the system manager 14 are provided as separate devices in the above-noted embodiments, these may be provided as a single device. Also, although in the first embodiment the measurement data from the sensor device 11a is arranged and completed by the gateway 15, these may be done in the monitoring control device 16.

Although the foregoing embodiments have been described for the example of a wireless communication system communicating wirelessly in conformance with ISA100.11a, the present invention may be applied also to a wireless communication system communicating wirelessly in conformance with WirelessHART (registered trademark).

The invention claimed is:
1. A communication apparatus comprising:
a storage temporarily storing data received via a wireless network from another communication apparatus that sends the data regarding feedback control at a fixed time interval, a transmission time stamp indicting a transmission time being attached to the data;
a delay timer configured to output time information indicating a time that is delayed by a pre-established delay time from an actual time at the fixed time interval; and
an arranger configured to read out and output at the fixed time interval the data stored in the storage using the time information output from the delay timer, each time the time information is output from the delay timer, the arranger being configured to read and output first data, to which the transmission time stamp indicating a time that is earlier than the time indicated by the time information output from the delay timer is attached, if the first data is stored in the storage, and to output empty data if the first data is not stored in the storage.

2. The communication apparatus according to claim 1, further comprising:
a completer configured to receive data arranged by the arranger and, if a loss of the arranged data occurs, to estimate and complete the lost data using data received before the lost data.

3. The communication apparatus according to claim 2, wherein the completer is configured to determine a change amount with respect to time of the data received immediately prior the occurrence of the data loss and to estimate the lost data using the change amount.

4. The communication apparatus according to claim 2, wherein the completer is configured to determine whether the data loss occurs a pre-established number of times in succession, and
if the completer determines that the data loss occurs the pre-established number of times in succession, the completer is configured to stop completion of the lost data and to maintain the data completed immediately before.

5. The communication apparatus according to claim 2, further comprising:
an alarm transmitter configured to transmit an alarm to a host device, and
wherein, if the data loss occurs a pre-established number of times in succession, the completer is configured to cause the alarm transmitter to transmit an alarm.

6. The communication apparatus according to claim 3, wherein the completer is configured to determine whether the data loss continues in succession, and
if the completer determines that the data loss continues in succession, the completer is configured to complete the lost data using a change amount smaller than the change amount used to perform completion immediately before.

7. The communication apparatus according to claim 1, wherein the another communication apparatus is a field device performing measurements required for the feedback control, and the data regarding the feedback control is measurement data measured by the field device.

8. The communication apparatus according to claim 1, wherein the communication apparatus is a field device performing operations required for the feedback control and causes arrangement of control data as the data regarding the feedback control transmitted from the another communication apparatus.

9. A wireless communication system comprising:
a field device configured to transmit data regarding feedback control at a fixed time interval and capable of wireless communication via a wireless network, a transmission time stamp indicting a transmission time being attached to the data;
a setting apparatus configured to set whether or not the field device is a control application; and
a communication apparatus configured to wirelessly communicate with the field device, the communication apparatus comprising a storage temporarily storing the data received via the wireless network from the field device, a delay timer configured to output time information indicating a time that is delayed by a pre-established delay time from an actual time at the fixed time interval, and an arranger configured to read out and output at the fixed time interval the data stored in the storage using the time information output from the delay timer, each time the time information is output from the delay timer, the arranger being configured to read and output first data, to which the transmission time stamp indicating a time that is earlier than the time indicated by the time information output from the delay timer is attached, if the first data is stored in the storage, and to output empty data if the first data is not stored in the storage, and, in accordance with the setting by the setting apparatus, switching whether or not to arrange the data transmitted from the field device.

10. The wireless communication system according to claim 9, further comprising:
a management apparatus configured to increment the number of times of re-transmission of the data via the wireless network if a transmission error occurs, regarding the field device that has been set by the setting apparatus as a control application.

11. The wireless communication system according to claim 9,
wherein the communication apparatus further comprises a completer configured to receive the data that has been arranged by the arranger and, when data loss has occurred in the arranged data, to estimate and complete the lost data using data received before the lost data.

12. The wireless communication system according to claim 11,
wherein the completer is configured to determine the change amount with respect to time of the data received immediately before the occurrence of the data loss and to estimate the lost data using the change amount.

13. The wireless communication system according to claim 11,
wherein the completer is configured to determine whether the data loss occurs a pre-established number of times in succession, and
if the completer determines that the data loss occurs in succession for the pre-established number of times, the completer is configured to stop the completing of the lost data and to maintain the data completed immediately before.

14. The wireless communication system according to claim 11,
wherein the communication apparatus further comprises an alarm transmitter configured to transmit an alarm to a host device, and
if the data loss occurs successively for a pre-established number of times, the completer is configured to cause the alarm transmitter to transmit an alarm.

15. The wireless communication system according to claim 12,
wherein the completer is configured to determine whether the data loss continues in succession, and
if the completer determines that the data loss continues in succession, the completer is configured to complete the lost data using a change amount smaller than the change amount used to perform completion immediately before.

* * * * *